United States Patent [19]
Ozcelik et al.

[11] Patent Number: 5,646,867
[45] Date of Patent: Jul. 8, 1997

[54] METHOD AND SYSTEM FOR IMPROVED MOTION COMPENSATION

[75] Inventors: Taner Ozcelik, San Jose, Calif.; James C. Brailean, Park Ridge, Ill.; Aggelos K. Katsaggelos, Chicago, Ill.; Stephen N. Levine, Itasca, Ill.

[73] Assignee: Motorola Inc., Schaumburg, Ill.

[21] Appl. No.: 506,147

[22] Filed: Jul. 24, 1995

[51] Int. Cl.$^6$ .......................................................... G06F 17/00
[52] U.S. Cl. ......................................................... 364/514 R
[58] Field of Search .......................... 364/514 R, 775.02, 364/514 C; 348/404, 407, 412, 413, 415; 382/244, 246, 232

[56] References Cited

U.S. PATENT DOCUMENTS 5,486,863  1/1996  Auyeung et al. .......................... 348/420
5,574,663  11/1996  Ozcelik et al. ......................... 364/514 R

OTHER PUBLICATIONS

"Image Sequence Compression Using a Pel–Recursive Motion–Compensated Technique" Robert J. Moorhead II, Sarah a. Rajala, and Lawrence W. Cook, IEEE Journal on Selected Areas in Communications, vol., SAC–5, No. 7, Aug. 1987, pp. 1100–1114.

"The Efficiency of Motion–Compensating Prediction for Hybid Coding of Video Sequences" Bernd Girod, IEEE Journal on Selected Areas in Communications, vol. SAC–5, No. 7, Aug., 1987 pp. 1140–1154.

"Improvements of Transform Coding Algorithm for Motion–Compensated Interframe Prediction Errors –DCT/ SQ Coding" Masahide Kaneko, Yosinori Hatori and Atsushi Koike, IEEE Journal on Selected Areas in Communciations, vol. SAC–5, No. 7 Aug., 1987.

"Gradient–Based Algorithms for Block–Oriented MAP Estimation of Motion and Application to Motion–Compensated Temporatl Interpolation" Claude Bergeron and Eric Dubois, IEEE Transactions on Circuits and Systems for Video Technology, vol. 1, No. 1, Mar. 1991 pp. 72–85.

"Use of Colour Information in Bayesian Estimation of 2–D Motion" Janusz Konrad and Eric Dubois, INRS–Telecommunications, M17.23, pp. 2205–2208.

"Motion–Compensated Filtering of Time–Varying Images" Eric Dubois, INRS–Telecommuincations, May, 1991, pp. 103–131.

"Comparison of Stochastic and Deterministic Solution Methods in Bayesian Estimation of 2D Motion", Janusz Konrad and Eric Dubois, INRS–Telecommunications, vol. 9, No. 4, Aug., 1991, pp. 215–228.

"Low Bit Rate Video Coding Using Robust Motion Vector Regeneration in the Decoder" Mark R. Banham, James C. Brailean, Cheuk L. Chan, Aggelos K. Katsaggelos, IEEE Transactions on Image Processing, vol. 3, No. 5, Sep., 1994, pp. 652–665.

"An Asaptive Regularized Recursive Displacement Estimation Algorithm", Serafim N. Efstratiadis, Aggelos K. Katsaggelos, IEEE Transactions on Image Processing, vol. 2, No. 3, Jul., 1993, pp. 341–352.

"Image Segmentation Based on Object Oriented Mapping Parameter Extimation" Michael Hotter and Robert Thoma, Signal Processing 15 (1988) pp. 315–344.

"Object–Oriented Motion Estimation and Segmentation in Image Sequences" Norbert Diehl, Signal Processing: Image Communications 3 (1990) pp. 23–56.

":Object–Oriented Analysis–Synthesis coding of Moving Images" Hans Georg Musmann, Michael Hotter and Jorn Ostermann, Signal Processing, Image Communications (1980) 117–135.

*Primary Examiner*—Ellis B. Ramirez
*Attorney, Agent, or Firm*—Darleen J. Stockley

[57]  ABSTRACT

The present invention provides a method (600) and system (100) for predicting a differential vector field. The method and system enable the detection and encoding of an area where motion compensating the past image frame to the current image frame, fails. Based on the DFD signal, the present invention detects regions where the motion compensation has failed (102). The boundaries of these regions are encoded and sent to the decoder (104). The intensity values contained in this region, by the current intensity frame, are also encoded and sent to the decoder. Based on the decoded region boundaries, the decoder decodes the intensity values and places them into the correct regions.

20 Claims, 3 Drawing Sheets

METHOD AND SYSTEM FOR IMPROVED MOTION COMPENSATION

FIELD OF THE INVENTION

The present invention relates generally to video coding, and more particularly to using a displacement vector field in video coding.

BACKGROUND OF THE INVENTION

Compression of digital video to a very low bit rate, VLBR, is a very important problem in the field of communications. In general, a VLBR is considered not exceed to 64 kilo-bits per second (Kbps) and is associated with existing personal communication system, such as the public switch telephone network and cellular system. To provide services like video on demand and video conferencing on these system, would require the information contained in a digital video sequence to be compressed by a factor of 300 to 1. To achieve such large compression ratios, requires that all redundancy present in a video sequence be removed.

Current standards, such as H.261, MPEG1, and MPEG2 provide compression of a digital video sequence by utilizing a block motion-compensated Discrete Cosine Transform, DCT, approach. This video encoding technique removes the redundancy present in a video sequence by utilizing a two-step process. In the first step, a block-matching, BM, motion estimation and compensation algorithm estimates the motion that occurs between two temporally adjacent frames. The frames are then compensated for the estimated motion and compared to form a difference image. By taking the difference between the two temporally adjacent frames, all existing temporally redundancy is removed. The only information that remains is new information that could not be compensated for in the motion estimation and compensation algorithm.

In the second step, this new information is transformed into the frequency domain using the DCT. The DCT has the property of compacting the energy of this new information into a few low frequency components. Further compression of the video sequence is obtained by limiting the amount of high frequency information encoded.

The majority of the compression provided by this approach to video encoding is obtained by the motion estimation and compensation algorithm. That is, it is much more efficient to transmit information regarding the motion that exists in a video sequence, as opposed to information about the intensity and color. The motion information is represented using vectors which point from a particular location in the current intensity frame to where that same location originated in the previous intensity frame. For BM, the locations are predetermined non-overlapping blocks of equal size. All pixels contained in these blocks are assumed to have the same motion. The motion vector associated with a particular block in the present frame of a video sequence is found by searching over a predetermined search area in the previous temporally adjacent frame for a best match. This best match is generally determined using the mean-squared-error (MSE) or mean-absolute-difference (MAD) between the two blocks. The motion vector points from the center of the block in the current fram to the center of the block which provides the best match in the previous frame.

Utilizing the estimated motion vectors, a copy of the previous frame is altered by each vector to produce a prediction of the current frame. This operation is referred to as motion compensation. As described above, the predicted frame is subtracted from the current frame to produce a difference frame which is transformed into the spatial frequency domain by the DCT. These spatial frequency coefficients are quantized and entropy encoded providing further compression of the original video sequence. Both the motion vectors and the DCT coefficients are transmitted to the decoder, where the inverse operations are performed to produce the decoded video sequence.

As mentioned above, motion compensating is very effective at removing temporal redundancy or temporal correlation from a video sequence. However, there exist areas in a video sequence where there is no temporal correlation. These areas result due to new objects entering or leaving the video scene. Also, they can be the result of moving objects covering and uncovering other objects within the video sequence. If motion compensation is used in these areas to removal temporal redundancies, generally a substantial decrease in the video encoder's compression efficiency will result. This decrease in compression efficiency is caused during the generation of the difference image since, in the particular areas where motion compensation fails, a large increase in the DFD signal's energy will result. The energy in these areas is generally larger than the energy contained in the current frame. This problem prohibits the encoding of video to the targeted VLBRs.

BRIEF DESCRIPTION OF THE DTRAWINGS

DETAILED DESCRIPTION OF PREFERRED EMBODIMENTS

The method and system described below enable the detection and encoding of an area where motion compensating the past image frame to the current image frame, fails. Based on the DFD signal, the present invention detects regions where the motion compensation has failed. The boundaries of these regions are encoded and sent to the decoder. The intensity values contained in this region, by the current intensity frame, are also encoded and sent to the decoder. Based on the decoded region boundaries, the decoder decodes the intensity values and places them into the correct regions.

In order to describe the method and system certain assumptions are made concerning the input video sequence. Specifically, the video source is assumed to be in a digital format where the number of pixels per row, the number of rows per frame, and the number of frames per second are known prior to the encoding process. Each pixel represents both the luminance and chrominance components using 8 bit integer numbers which span from 0 to 255. As mentioned above, these assumptions are only made to help facilitate the description of the method and system and should not be viewed as restrictions to applications where these assumptions do not hold.

Figure 1:
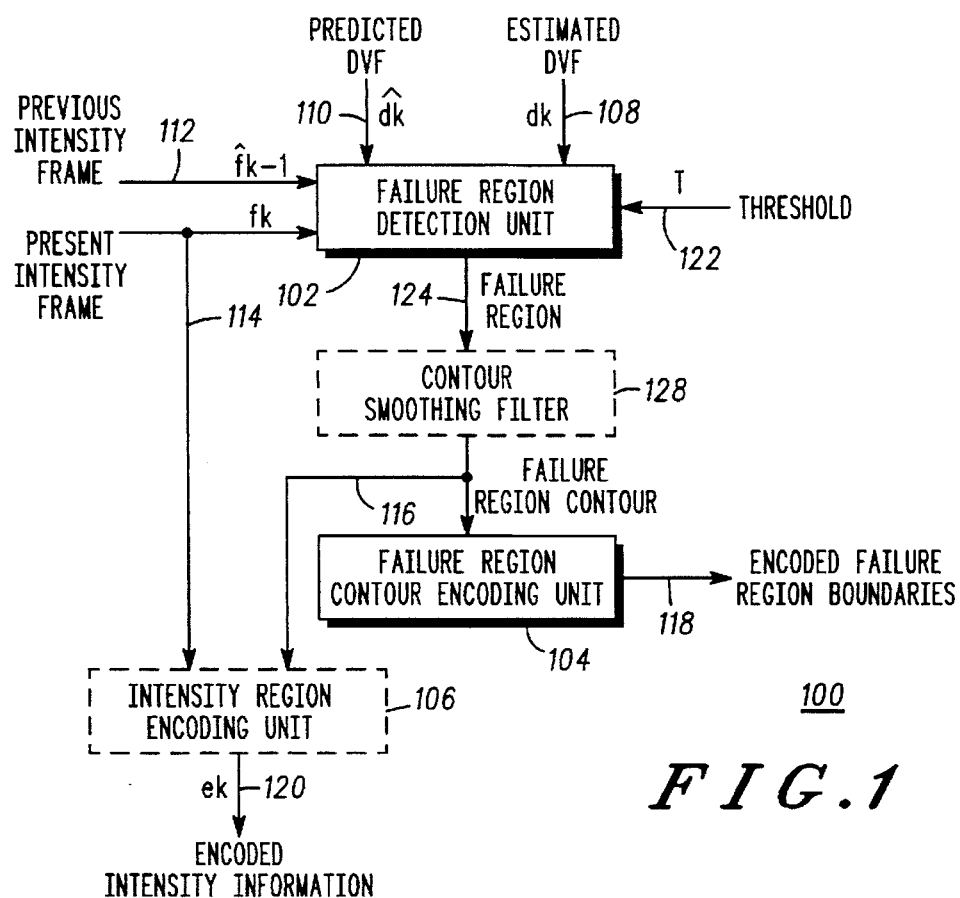
FIG. 1 is a diagram of a preferred embodiment of a system for improved motion compensation in accordance with the present invention.

FIG. 1, numeral 100, is a diagram of a preferred embodiment of a system improved motion compensation in accordance with the present invention. This system is comprised of a failure region detection unit (102), a contour smoothing filter (128), a failure region boundary encoding unit (104), and an intensity region encoding unit (106). Based on a predicted displacement vector field (DVF) (108), an estimated DVF (110), a previous intensity frame (112), a current intensity frame (114), and a threshold (122), the motion compensation failure region detection unit (102) determines regions where the predicted DVF (108) fails in describing the motion that occurs in the video sequence between the current (114) and previous (112) intensity frames. The boundaries or contours of the detected regions (124) are smoothed by a contour smoothing filter (128) lowering the number of bits they require to be encoded. The smoothed boundaries of the motion compensation failure regions (116) are provided to the failure region boundary encoding unit (104) where they are encoded (118). These regions (116) along with the current intensity frame (114) are also provided to the intensity region encoding unit (106), where intensity information contained in the region is encoded (120). The system or parts of the system for improved motion compensation may be implemented in an application specific integrated circuit, ASIC, a gate array, or a digital signal processor, DSP.

Figure 2:
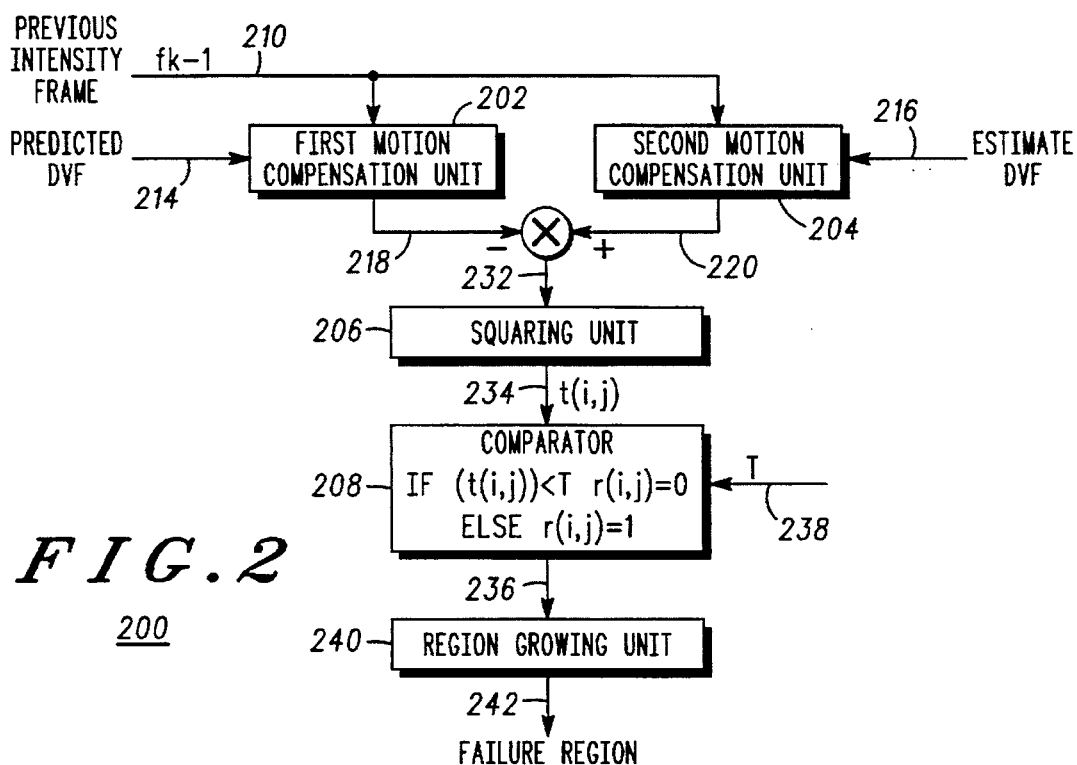
FIG. 2 is a diagram of a preferred embodiment of a motion compensation failure detection unit in accordance with the present invention.

FIG. 2, numeral 200, is a diagram of the preferred embodiment of a motion compensation failure detection unit (102) in accordance with the present invention. This unit comprises a first motion compensation unit (202), a second motion compensation unit (202), a squaring unit (206), and a comparator (208). The motion compensation failure detection unit (102) determines the failure regions by performing the following test for each pixel location in the current intensity frame. First, the previous intensity frame (210) is motion compensated using the both a predicted DVF (214) and an estimated DVF (216) using the first and second motion compensation units (202 and 204), respectively. The two resulting motion compensated frames (218) and (220) are compared (224) generating a difference signal (232). This difference signal (232) is squared by the squaring unit (206) resulting in the input signal, t(i,j), (234) for the comparator (208). The comparator (208) classifies each pixel location (i,j) in the current intensity frame as a failure or not utilizing the following test if
    $t(i,j) < T$
then
    $r(i,j) = 0$
else
    $r(i,j) = 1$.

Pixel (i,j) is part of a failure region if r(i,j)=1, while r(i,j)=0 indicates that it is not a motion compensation failure. The output, r(i,j) (236), is a binary map indicating regions in the current frame (114) where the predicted DVF (108) differs greatly from the estimated DVF (110). These are the regions where motion compensation of the previous frame failed to provide an adequate prediction of the current frame. Therefore, the intensity information along with the region information must be encoded.

The contour smoothing unit (128) takes the initial map r(i,j) (236) of the motion compensation failure regions and smoothes the boundaries or contours outlining these regions. This operation also removes any isolated pixels that may have been misclassified due to noise as belonging to a motion compensation failure. A binary morphological filter is utilized for this operation. Specifically, the contour smoothing filter is an open and close morphological filter characterized by the following equations $$b(i,j) = \text{close}[\text{open}[r(i,j)]] \quad (1)$$

where $$\text{close}[r(i,j)] = (r(i,j) \oplus s(i,j)) \ominus s(i,j) \quad (2)$$

$$\text{open}[r(i,j)] = (r(i,j) \ominus s(i,j)) \oplus s(i,j), \quad (3)$$

and $$r \oplus s = \max[r(i-m, j-n), \ldots, r(i,j), \ldots, r(i+m, j+n)] \quad (4)$$

$$r \ominus s = \min[r(i-m, j-n), \ldots, r(i,j), \ldots, r(i+m, j+n)]. \quad (5)$$

The structuring element s determines which neighborhood pixels are to be considered in the opening and closing operations. For instance, in Equations 4 and 5 the structuring element is a square that extends m pixels above and below and n pixels to right and the left of pixel (i,j). The open and close morphological filter smoothes the contours of the motion compensation failure regions r(i,j) in the following manner. The open operation grows the contours of these regions, filling in any jagged edges that may exist. The closing operation returns the boundaries to the original locations; however, in the rough areas the contour remains in its new position. The result of this operation is that the output of the contour smoothing filter now has smooth contours in once previously rough areas. The pixels which actually describe the boundary of the failure regions are determined using the following equation $$b(i,j) = \begin{cases} 1 & \text{if } (2r(i,j) - r(i-1,j) - r(i,j-1)) \neq 0 \\ 0 & \text{otherwise} \end{cases},$$

where b(i,j)=1 indicates a boundary pixel. It is a smoothed failure region boundary b(i,j) (308) that is provided to the region contour encoding unit (104).

Figure 3:
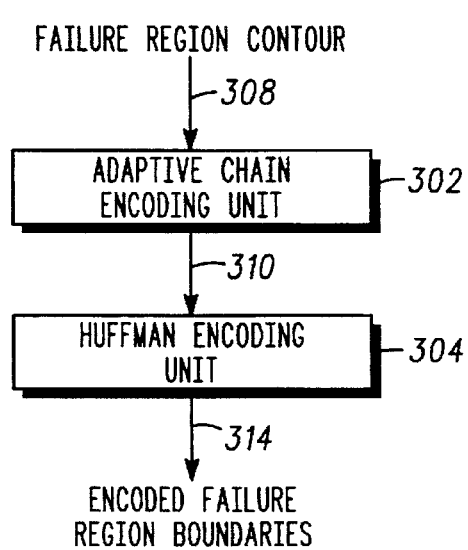
FIG. 3 is a diagram of a preferred embodiment of a failure region boundary encoding unit in accordance with the present invention.

FIG. 3, numeral 300, is the preferred embodiment of a failure region contour encoding unit (104). The failure region contour encoding unit (104) comprises an adaptive chain encoding unit (302), a run-length encoding unit (304), and a Huffman encoding unit (306). The smoothed failure region boundary b(i,j) (308) is first encoded by the adaptive chain encoding unit (302). The adaptive chain encoding unit (302) codes the boundaries of the smoothed failure region boundary b(i,j) (308) by using a limited direction alphabet. First, an initial or starting pixel is chosen. This pixel is generally the first pixel encountered when scanning through the smoothed failure region boundary b(i,j) (308). Once this location is determined, a clockwise encoding of the smoothed failure region boundary b(i,j) (308) is performed. Specifically, the direction alphabet is limited to 3 symbols $A_d \in \{L, S, R\}$, where $A_d$ denotes the limited directional alphabet, L is denotes a left turn, R denotes a right turn and S denotes a straight move based on the previously encoded symbol. In other words, the direction of the previous move on the boundary is labeled as a straight move for the current move (from the previous pixel to the current pixel).

Figure 4:
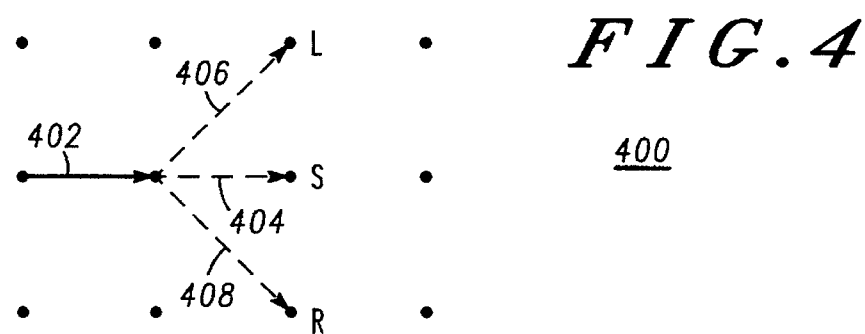
FIG. 4 is a diagram of a first example for possible coded directions in accordance with the present invention.
Figure 5:
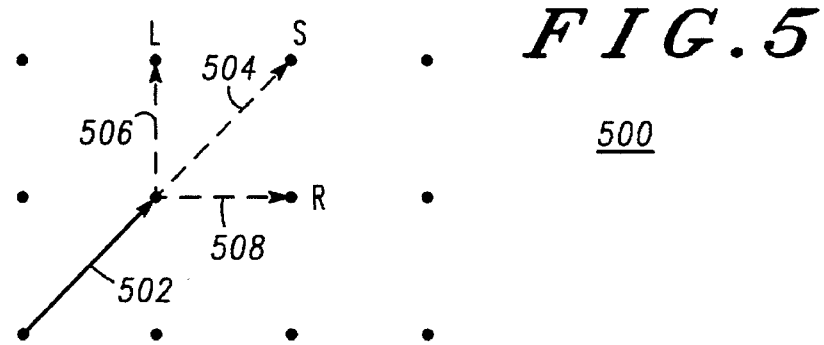
FIG. 5 is a diagram of a second example for possible coded directions in accordance with the present invention.

This technique for labeling the directions is demonstrated in FIG. 4 and FIG. 5. FIG. 4, numeral 400, is a diagram of a first example for possible coded directions in accordance with the present invention. FIG. 5, numeral 500, is a diagram of a second example for possible coded directions in accordance with the present invention. In FIG. 4 the previous move (402) is a horizontal move; therefore the horizontal direction in the current move (404) is labeled as a straight move. A move to North-East (406) is labeled as a left (L) turn while a move to the South-East (408) is labeled as a right (R) turn. All other turns are not allowed. Similarly, FIG. 5 shows the case when the previous move (502) is diagonal. The current diagonal move (504) is now labeled as the straight move, while directions North (506) and East (508) are labeled as L and R, respectively. For the case when a turn exists that is not contained in $A_d$, then the available turn which tracks the closest, is chosen.

The output (310) of the adaptive chain encoding unit (302) are the symbols indicating the direction as well as a starting location. The starting location gives the horizontal (i) and vertical (j) indices of the pixel location from which the representation provided by the adaptive chain encoding of the failure region boundaries is interpreted. Both the horizontal and vertical indices are coded using 8 bits. The directional symbols are encoded using an (304) Huffman encoding. The specific table used in this process is shown below

```
Symbol  Code
   S      0
   R     1 0
   L     1 1
```

It is observed that the symbols are correlated from one pixel to the next. In other words, the conditional probability of a symbol at the current location given the previous symbol that is encoded is not necessarily equal to the probability of that particular symbol at the current location. For instance, if the previous move is S, the next move is more likely to be S than L or R. Taking this observation into account, the Huffman encoding algorithm employed contains an implicit run-length encoding. The output of the Huffman encoding unit (304) is a bit-stream representing the smoothed failure region boundaries b(i,j) (308). This bit-stream is transmitted to the decoder for use in decoding the intensity pixels contained within. The technique used to encoded this intensity information is described below.

The intensity region encoding unit (106) encodes the intensity values of the pixels which are contained within the region boundaries (308). These pixels are encoded using an 8 by 8 block DCT approach. That is, the pixels contained within the region boundaries are organized into blocks of 8 pixels by 8 pixels. The intensity values contained in these blocks are then transformed into the DCT domain, where they are quantized and entropy encoded. For blocks which also lie on the boundaries, all pixels within the 8 by 8 block are encoded whether they lie in the region or not. The bit-stream is then delivered to the decoder where the encoded bit-streams for both the region boundary (118) and the intensity values (120) are decoded. Based on the boundary information, the values are then placed into their correct spatial locations.

Figure 6:
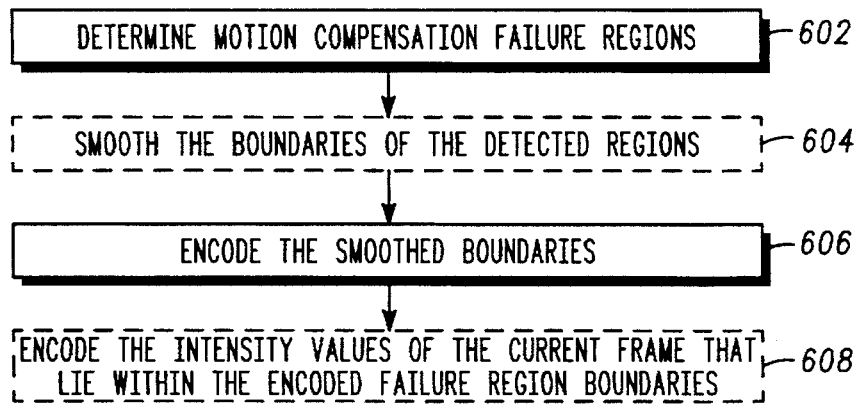
FIG. 6 is a flow diagram of a preferred embodiment of steps of a method for improved motion compensation in accordance with the present invention.

FIG. 6, numeral 600, is a flow diagram of a preferred embodiment of a method for improved motion compensation in accordance with the present invention. The first step is to determine where motion compensation fails to remove the temporal redundancy (602). The boundaries of the detected failure regions are determined and smoothed using a morphological filter (604). Next, the boundaries are encoded (606). In the last step, the intensity values of the current frame which lie within the failure regions boundaries are encoded (608).

Figure 7:
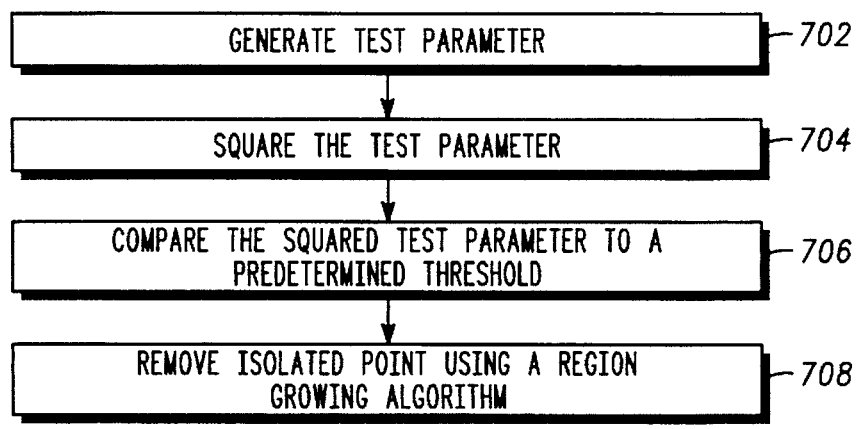
FIG. 7 is a flow diagram of a preferred embodiment of steps of a method for motion compensation failure detection in accordance with the present invention.

FIG. 7, numeral 700, is a flow diagram of a preferred embodiment of a method for detecting motion compensation failure regions in accordance with the present invention. In the first step, a test parameter is generated based on the previous intensity frame, the previous DVF, and the present DVF (702). Next, this value is squared (704) to remove any dependence on the sign. The square of the test parameter is next compared to a predetermined threshold (706). Finally, the detected failure areas are operated on by a predetermined region growing algorithm to remove any isolated points (708).

Figure 8:
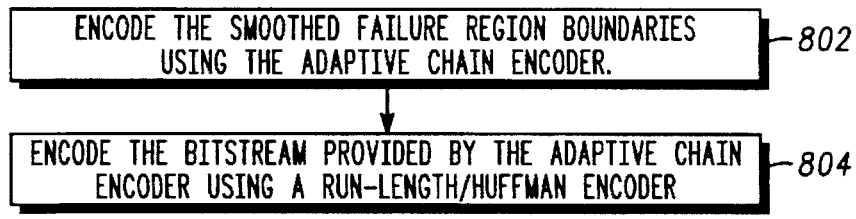
FIG. 8 is a flow diagram of a preferred embodiment of steps of a method for failure region boundary encoding in accordance with the present invention.

FIG. 8, numeral 800, is a flow diagram of a preferred embodiment of a method for encoding the boundaries of a region in accordance with the present invention. First, the boundary of a region is encoded using an adaptive chain encoder (802). Next, the bitstream provided by the adaptive chain encoder is further encoded using a run-length/Huffman encoder (804).

We claim:

1. A method for improving motion compensation, comprising:

detecting failure regions, using a failure region detection unit, based on a previous intensity frame, a present intensity frame, a predicted differential vector field, a predicted DVF, an estimated differential vector field, an estimated DVF, and a threshold; and encoding boundaries of the failure regions, using a failure region contour encoding unit.

2. The method according to claim 1, wherein detecting failure regions includes:

motion compensating the previous intensity frame based on the predicted DVF to provide a first signal;

motion compensating the previous intensity frame based on the estimated DVF to provide a second signal;

calculating a third signal based on the difference between the first and the second signal; and comparing the third signal to the threshold to detect a presence of a failure region.

3. The method according to claim 1, wherein encoding includes:

adaptive chain encoding a failure region contour, and run-length encoding/Huffman encoding to provide an encoded failure region boundary.

4. The method according to claim 3, further comprising contour filtering following the Huffman encoding.

5. The method according to claim 1, further comprising encoding intensity values of a current frame that lie within encoded failure region boundaries.

6. The method of claim 1 wherein the steps of the method are embodied in a tangible medium of/for a Digital Signal Processor, DSP.

7. The method of claim 1 wherein the steps of the method are embodied in an Application Specific Integrated Circuit, ASIC.

8. The method of claim 1 wherein the steps of the method are embodied in a tangible medium of/for a computer.

9. The method of claim 8 wherein the tangible medium is a computer diskette.

10. The method of claim 8 wherein the tangible medium is a memory unit of the computer.

11. A system for improving motion compensation, comprising:

a failure region detection unit, coupled to receive a previous intensity frame, a present intensity frame, a threshold, a predicted differential vector field, a predicted DVF, and an estimated DVF, for detecting failure regions based on the previous intensity frame, the present intensity frame, the predicted DVF, the estimated differential vector field, DVF, and the threshold; and a failure region contour encoding unit, operably coupled to the failure region detection unit, for encoding boundaries of the failure regions.

12. The system according to claim 11, wherein the failure region detection unit includes:

a first motion compensation unit, coupled to receive the previous intensity frame and the predicted DVF, for motion compensating the previous intensity frame based on the predicted DVF to provide a first signal;

a second motion compensation unit, coupled to receive the previous intensity frame and the estimated DVF, for motion compensating the previous intensity frame based on the estimated DVF to provide a second signal;

a differencing circuit, operably coupled to the first and second motion compensation units, to provide a difference between the first and the second signal;

a squaring unit, operably coupled to the differencing circuit, for calculating a third signal based on the difference between the first and the second signal; and a comparator, operably coupled to the squaring unit, for comparing the third signal to the threshold to detect a presence of a failure region.

13. The system according to claim 11, wherein failure region contour encoding unit includes:

an adaptive chain encoding unit, coupled to receive a failure region contour, for chain encoding, and a Huffman encoding unit, coupled to the adaptive chain encoding unit, for run-length encoding to provide an encoded failure region boundary.

14. The system according to claim 13, further comprising a contour smoothing filtering, operably coupled to the failure region detection unit, for providing the failure region contour based on a failure region.

15. The system according to claim 11, further comprising an intensity region encoding unit, coupled to receive the present intensity frame and the failure region contour, for encoding intensity values of a current frame that lie within encoded failure region boundaries.

16. The system of claim 11 wherein the steps of the system are embodied in a tangible medium of/for a Digital Signal Processor, DSP.

17. The system of claim 11 wherein the steps of the system are embodied in an Application Specific Integrated Circuit, ASIC.

18. The system of claim 11 wherein the steps of the system are embodied in a tangible medium of/for a computer.

19. The system of claim 18 wherein the tangible medium is a computer diskette.

20. The system of claim 18 wherein the tangible medium is a memory unit of the computer.

* * * * *

UNITED STATES PATENT AND TRADEMARK OFFICE
CERTIFICATE OF CORRECTION

PATENT NO. : 5,646,867
DATED : July 8, 1997
INVENTOR(S) : Taner Ozcelik, James C. Brailean, Aggelos K. Katsaggelos, and Stephen N. Levine It is certified that error appears in the above-indentified patent and that said Letters Patent is hereby corrected as shown below:

On the title page, Item [73],

--Assignee: Motorola, Inc., Schaumburg, IL and Northwestern University, Evanston, IL--

Signed and Sealed this

Sixteenth Day of June, 1998

Attest:

BRUCE LEHMAN

*Attesting Officer*  *Commissioner of Patents and Trademarks*